(12) United States Patent
Kim et al.

(10) Patent No.: US 11,738,889 B2
(45) Date of Patent: Aug. 29, 2023

(54) INTEGRATED SATELLITE CHASSIS WITH INTERNAL PROPELLANT TANK STRUCTURE

(71) Applicant: California Institute of Technology, Pasadena, CA (US)

(72) Inventors: Hunjoo Kim, Pasadena, CA (US); Andrew A. Shapiro-Scharlotta, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 349 days.

(21) Appl. No.: 16/825,720

(22) Filed: Mar. 20, 2020

(65) Prior Publication Data
US 2020/0299006 A1   Sep. 24, 2020

Related U.S. Application Data

(60) Provisional application No. 62/821,327, filed on Mar. 20, 2019.

(51) Int. Cl.
*B64G 1/40* (2006.01)
*B64G 1/10* (2006.01)

(52) U.S. Cl.
CPC ............... *B64G 1/402* (2013.01); *B64G 1/10* (2013.01)

(58) Field of Classification Search
CPC ............ B64G 1/402; B64G 1/10; F17C 2270/0194; F17C 13/008; B65D 90/52
See application file for complete search history.

(56) References Cited

U.S. PATENT DOCUMENTS

| 4,397,408 | A | * | 8/1983 | Robert | B64G 1/402 |
| | | | | | 222/394 |
| 6,499,287 | B1 | * | 12/2002 | Taylor | F02K 9/605 |
| | | | | | 244/171.1 |
| 6,506,513 | B1 | * | 1/2003 | Yonetsu | H01M 8/04186 |
| | | | | | 429/513 |
| 2011/0214410 | A1 | * | 9/2011 | Yamamoto | F02K 9/605 |
| | | | | | 220/592.01 |
| 2016/0200457 | A1 | * | 7/2016 | Droppers | F02K 9/58 |
| | | | | | 244/171.1 |
| 2018/0229863 | A1 | * | 8/2018 | Veto | F17C 13/008 |
| 2020/0182066 | A1 | * | 6/2020 | Theertham | F01D 5/147 |
| 2020/0255166 | A1 | * | 8/2020 | Umemura | B64G 1/402 |

FOREIGN PATENT DOCUMENTS

WO            9961773 A2    12/1999

* cited by examiner

*Primary Examiner* — Brady W Frazier
*Assistant Examiner* — Shanna Danielle Glover
(74) *Attorney, Agent, or Firm* — KPPB LLP

(57) ABSTRACT

A propellant storage system that utilizes an integrated internal lattice structure within the fuel storage tank(s) to provide additional strength and anti-slosh features. The internal lattice structure lends its additional strength properties to adapt the fuel storage tank to unconventional geometries to allow for better compaction and weight savings in deployment vehicles such as satellites.

18 Claims, 10 Drawing Sheets

INTEGRATED SATELLITE CHASSIS WITH
INTERNAL PROPELLANT TANK
STRUCTURE

CROSS-REFERENCED APPLICATIONS

This application claims priority to U.S. Provisional Patent Application No. 62/821,327 filed on Mar. 20, 2019. The enclosure of which is included herein by reference in its entirety.

STATEMENT OF FEDERALLY SPONSORED RESEARCH

This invention was made with government support under Grant No. 80NM0018D004 awarded by NASA (JPL). The government has certain rights in the invention.

FIELD OF THE INVENTION

The present invention generally relates to satellite propulsion systems and propellant management devices used in such propulsion systems.

BACKGROUND OF THE INVENTION

Satellites are typically outfitted with a propulsion system that helps to keep the satellite in orbit and control attitude adjustments to the position of the satellite within the orbit. The evolution of satellites has led to an increase in the development and production of a smaller class of satellites known as CubeSats. CubeSats are smaller more compact satellites that can vary in size and be outfitted to perform a variety of functions. The smaller more compact size allows such satellites to be deployed with larger payloads which can result in a cost savings for deployment. Much like a traditional satellite, smaller CubeSats also require a propulsion system to control the attitude of the satellite helping to maintain its position for the given purpose of the satellite.

Satellite propulsion systems can vary from traditional propellants such as liquid or solid rocket propellant to electronic propulsion systems. Some propulsion systems may also include hybrid propulsion systems that can serve multiple purposes during the life of the satellite. In addition to the type of propellant used, many satellites require the propellant system to be housed in some type of tank or pressure vessel. Traditional pressure vessels tend to be cylindrical or spherical in shape due to the higher pressures often seen in the activation of the propellant to generate thrust.

The conditions for which satellites operate, i.e. low gravity environments, often require the use of some type of propellant management device (PMD). PMD's are devices that enable the satellite to use the propellant in such low gravity operating environments. PMD's are typically classified as control or communication devices. Traditionally, PMD's consist of baffles, fins, vanes, screens and/or other devices placed within the propellant tank and operate on the principle of surface tension to control the flow of propellant into motor. Although new developments in manufacturing technology has allowed for the implementation of more complex designs, traditional manufacturing methods are still used which tend to make the implementation of mechanical features such as PMD's more difficult and restricting in overall tank design.

BRIEF SUMMARY OF THE INVENTION

Many embodiments are directed to a propellant tank system that has a first tank with a first longitudinal axis along and an outer wall and an inner wall surface forming an internal cavity of the tank wherein the internal cavity is configured to contain a liquid fuel. Additionally, the tank has a lattice structure disposed within the internal cavity thereby occupying a volume within the cavity. The lattice structure is connected to a plurality of points on the inner wall surface of the fuel tank such that the lattice structure provides additional strength to the fuel tank and wherein the lattice structure provides additional surface area by which a liquid fuel within the fuel tank may reduce a slosh of the liquid during movement of the system as the system moves along the longitudinal axis.

In other embodiments, the tank further comprises a propellant management device disposed in a portion of the tank wherein the propellant management device controls the flow of fuel from the tank to a fuel line.

In still other embodiments, the propellant management device and the lattice structure are made from a metallic foam.

In yet other embodiments, wherein the propellant management device has a variable gradient density.

In still yet other embodiments, wherein the shape of the tank is selected from a group consisting of, cuboidal, cylindrical, spherical, prismatic, and conical.

In other embodiments, the liquid propellant storage system has a motor system integrated within the volume of the tank and wherein the motor system comprises a motor combustion chamber connected to an exhaust nozzle wherein the motor system receives fuel from the at least on fuel tank into the motor combustion chamber through the fuel lines.

In still other embodiments, the liquid propellant storage system has at least one fuel control valve integrated within the volume of the internal cavity of the tank and wherein the at least one fuel control valve controls the flow of propellant from the internal cavity to the motor system In yet other embodiments, the liquid propellant storage system has a motor combustion control assembly disposed within the motor combustion chamber.

In still yet other embodiments,

In other embodiments, the liquid propellant storage system has at least a second tank adjacent to the first tank wherein the second tank comprises a second longitudinal axis parallel to the first longitudinal axis, and wherein the second tank has a second internal cavity wherein the second internal cavity is configured to contain a second liquid fuel. A second lattice structure is disposed within the second internal cavity thereby occupying a volume within the second internal cavity, wherein the second lattice structure is connected to a plurality of points on an inside wall surface of the second tank such that the second lattice structure provides additional strength to the second tank and wherein the second lattice structure provides additional surface area by which the second liquid fuel within the second tank may reduce a slosh of the second liquid during movement of the system as the system moves along the longitudinal axis.

Other embodiments are directed to a satellite structure with a fuel storage tank. The satellites fuel storage system has a first tank with a first longitudinal axis along and an outer wall and an inner wall surface forming an internal cavity of the tank wherein the internal cavity is configured to contain a liquid fuel. Additionally, a lattice structure disposed within the internal cavity thereby occupying a volume within the cavity, wherein the lattice structure is connected to a plurality of points on the inner wall surface of the fuel tank such that the lattice structure provides additional strength to the fuel tank and wherein the lattice structure provides additional surface area by which a liquid fuel within the fuel tank may reduce a slosh of the liquid during movement of the system as the system moves along the longitudinal axis.

In yet other embodiments, the storage system is formed using additive manufacturing.

Other embodiments are directed to a liquid propellant storage system that has a first tank with a first longitudinal axis along and an outer wall and an inner wall surface forming an internal cavity of the tank wherein the internal cavity is configured to contain a liquid fuel. Additionally, a propellant management device disposed within the internal cavity wherein the propellant management device occupies the entire internal cavity and wherein the propellant management device has a plurality of geometric shaped defining a geometry such that the liquid fuel can flow within plurality of geometric shapes.

In other embodiments, the geometry is selected from a group consisting of gyroid, diamond, and Schwarz.

Additional embodiments and features are set forth in part in the description that follows, and in part will become apparent to those skilled in the art upon examination of the specification or may be learned by the practice of the disclosure. A further understanding of the nature and advantages of the present disclosure may be realized by reference to the remaining portions of the specification and the drawings, which forms a part of this disclosure.

BRIEF DESCRIPTION OF THE DRAWINGS

The description will be more fully understood with reference to the following figures, which are presented as exemplary embodiments of the invention and should not be construed as a complete recitation of the scope of the invention, wherein.

DETAILED DESCRIPTION OF THE INVENTION

Turning now to the drawings, many embodiments are directed to a satellite structure with a propellant tank that contains an integrated lattice structure. The lattice structure, in many embodiments, is disposed within one or more propellant tank components and makes up a portion of the internal space defied by the sides of the propellant tank. The lattice structure is designed to provide the structural integrity and support that the propellant tank needs during satellite motor operation, thereby creating a structurally sound propellant tank system for use in a number of satellite geometries. In other embodiments, the propellant tank structures may be configured with a propellant management device integrated within the structure of the propellant tank. In accordance with many embodiments, the satellite structure as well as the internal components, including the propellant tank(s), motor housing, and nozzle may be produced using additive manufacturing.

Space structures such as satellites are often concerned with weight and such limitations tend to affect the types of materials and construction methodologies used to produce current satellite structures. Accordingly, current tank designs tend to be limited to using thin sheet members formed in such a manner that it is capable of withstanding large internal pressure loads without having stress concentration geometries. This tends to limit the current methodologies to spherical and/or cylindrical tank designs. While such tank designs perform well in handling internal pressures from the propellants, they tend to be difficult to integrate into satellite designs that may be more compact, such as CubeSats. Cylindrical and spherical tank designs often require additional mating features and/or structures to support the tank within the mechanical structure of the satellite, thus making them less volume efficient from a packaging perspective.

Furthermore, current methodologies for propellant tank manufacturing involves extensive cost and longer lead times due to the difficult task of integrating internal features. Propellant management device (PMD) and anti-slosh baffles, which are two of the commonly utilized internal tank features, are generally welded into the sheet metal liner of the propellant tanks. Due to the complexity of this task, a tank production cycle could take more than a year, and cost hundreds of thousands of dollars. Therefore, new and less costly methods to produce propellant tanks with integrated complex features such as propellant management devices is highly desirable. Additionally, propellant tanks that are not constrained by traditional cylinder and/or spherical shapes could be beneficial in the overall packaging and weight reduction requirements of space based systems.

Figure 1:
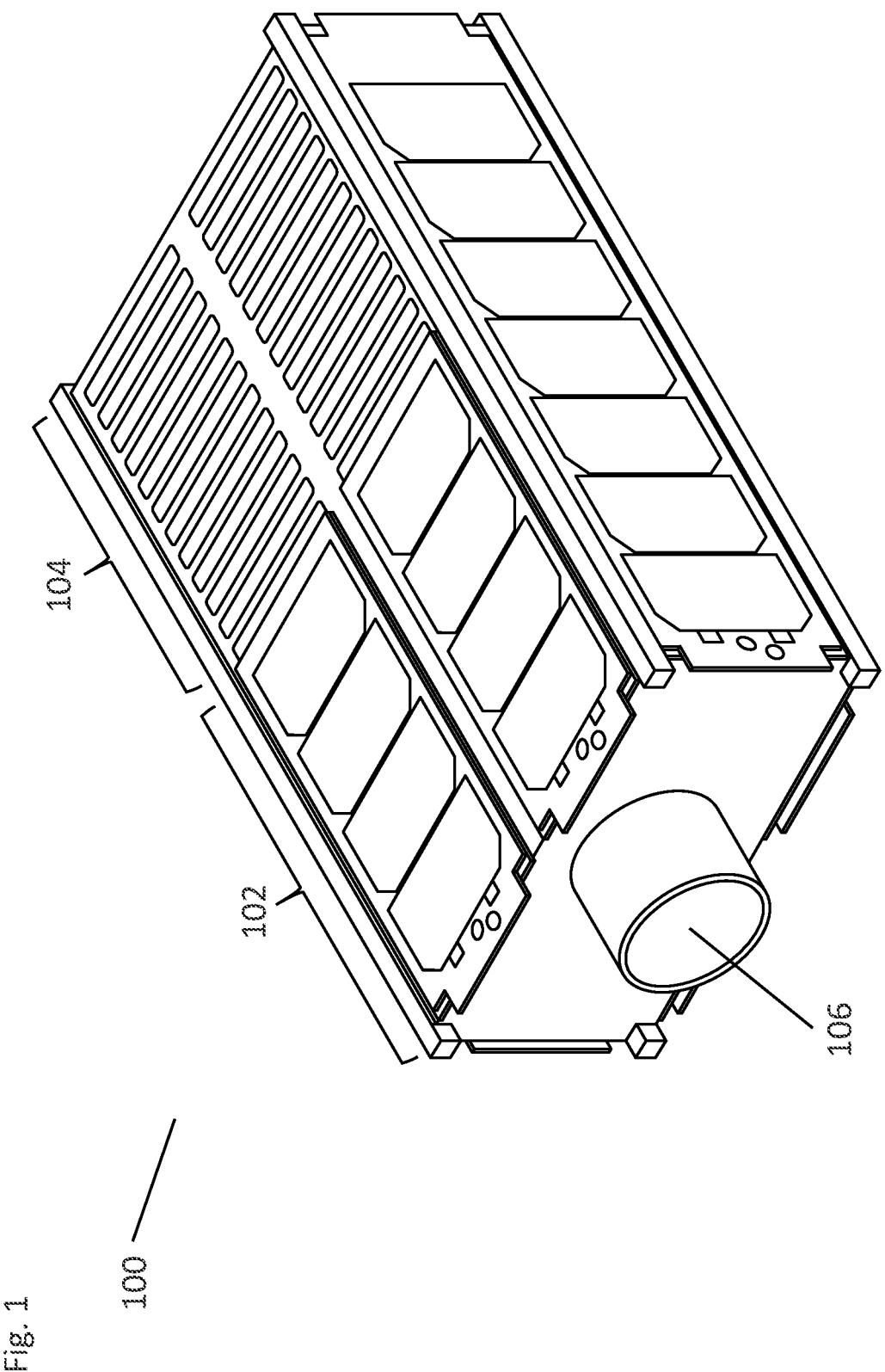
FIG. 1 illustrates a satellite structure in accordance with embodiments of the invention.

Turning now to the figures, embodiments of an improved propellant storage system are illustrated. In accordance with many embodiments, the tank design and/or the cubesat itself can be fully integrated as a single piece. As will be described in the various embodiments, the Cubesat, the fuel tank and any PMD's can be produced simultaneously, thereby reducing the production time and overall cost of the device. FIG. 1 illustrates an embodiment of a CubeSat 100 with an improved propellant tank design. Many CubeSats are segregated into portions such as a motor portion 102 and a payload portion 104. The payload portion 104 may be designed to house or contain various components of the satellite including control systems, electronics, scientific experiments, etc. The motor portion 102 may be configured to house the fuel tank(s) and motor components such as a nozzle 106 whereby the satellite can expel the combusted fuel to move or manipulate the position of the satellite. Although FIG. 1 does not illustrate the internal components of the satellite, FIGS. 2-5 illustrate embodiments of a satellite structure with a non-traditional fuel structures.

Figure 2:
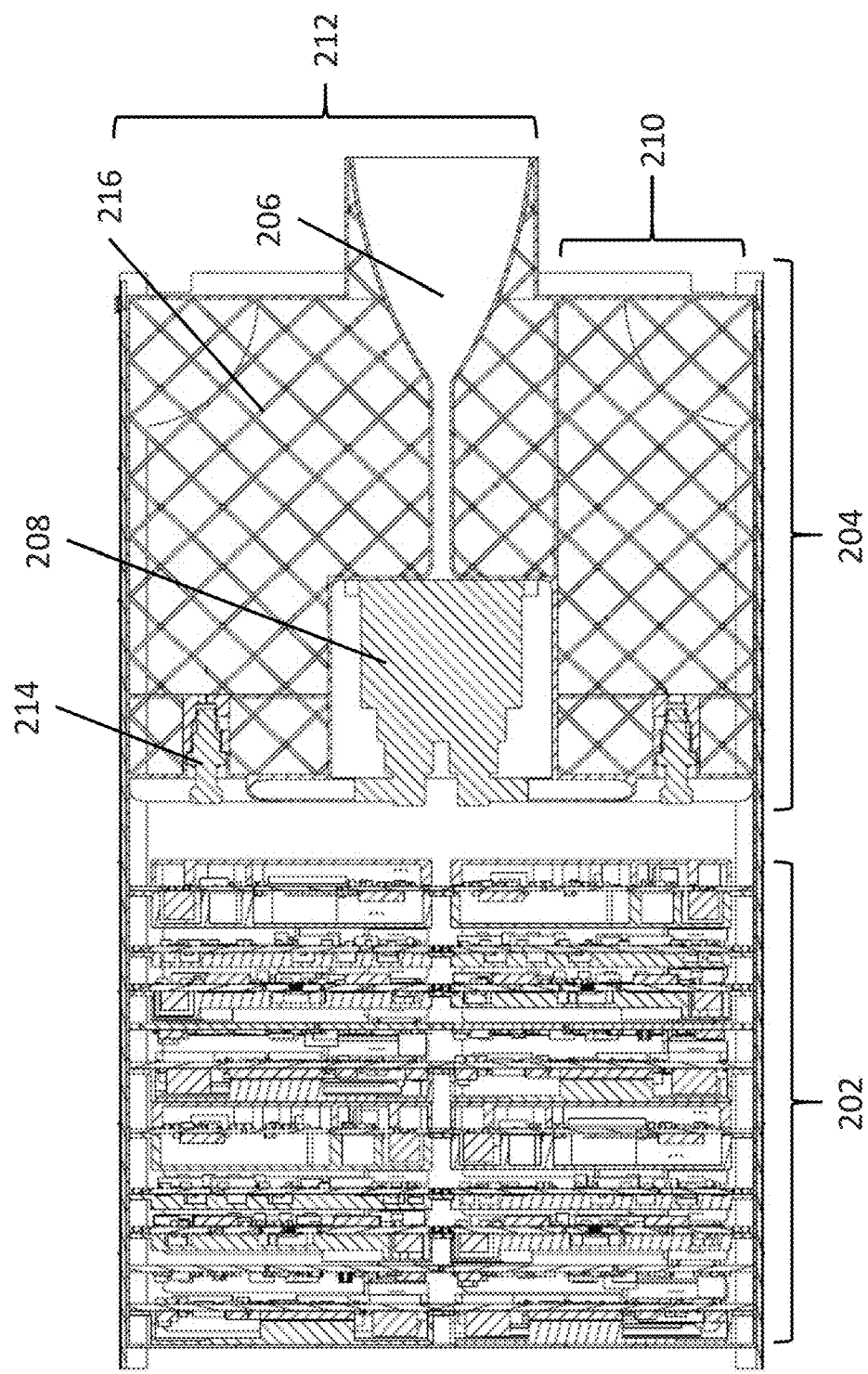
FIG. 2 illustrates a cross sectional view of a satellite structure with an integrated propellant tank structure in accordance with embodiments of the invention.

Referring now to FIG. 2, a cross-sectional view of an embodiment of a satellite structure 200 is illustrated. As can be seen in some embodiments, the satellite 200 may be configured with a payload portion 202 that houses various components of the satellite as discussed previously. It can be seen that many embodiments may configure the payload portion with layers of components. The motor portion 204, in accordance with some embodiments may be adjacent to the payload portion of the satellite and contain various elements that make up the fuel tank system and motor including the nozzle 206 and the motor combustion chamber and controls 208. In many embodiments, the motor portion 204 of the satellite may be configured to hold a liquid propellant system (210 and 212) which would contain a propellant section 210 and an oxidizer section 212. Each portion of the propellant may be a separate and distinct section to keep the propellant and the oxidizer separated until they are needed for propulsion. Many embodiments may also have control valves 214 connected to the propellant and oxidizer tanks to control the flow of the fuel into the combustion chamber 208.

In accordance with many embodiments the internal volume of the fuel tank system may have a lattice structure 216 that extends throughout the tank system. In accordance with many embodiments, the lattice structure can consist of multiple interlinking members that extend from one edge of the inner tank wall to another edge. In many embodiments the lattice structure 216 can perform many functions that allow for the traditional spherical and cylindrical structures to be avoided. For example, the lattice structure 216 in the propellant and oxidizer tanks can serve as a structural support mechanism. The design and layout of the lattice can serve to provide load bearing members throughout the tank system. Such structural support can reduce or eliminate the stress concentration points that naturally exist in non-spherical or non-cylindrical design. For example, the embodiment illustrated in FIG. 2 shows propellant and oxidizer tanks that are rectangular in shape. The lattice structure 216 can be configured to be within any shape of a tank. The adaptability of the tank structure that incorporates an internal lattice support structure 216 can allow for satellites to take on almost any shape. Accordingly, satellites can then be adjusted to fit into nearly any form factor for deployment.

In addition to the structural support that a lattice element may provide, internal lattice structures can also serve as an anti-slosh feature within the tank volume. As a type of propellant management device, an anti-slosh feature can help to control the movement of the propellant during the movement of the satellite. Within the realm of fluid dynamics, fluid, to include liquid fuel, will move within the container as the container is moved. This is what creates slosh. Slosh is undesirable because it can dramatically alter the dynamics of the system or structure within which the liquid is contained. Additionally, slosh can affect a satellite's ability to maintain control of the craft during flight. Therefore, the reduction in slosh is highly sought after in the development and design of fuel systems for satellites and rockets.

Figure 3:
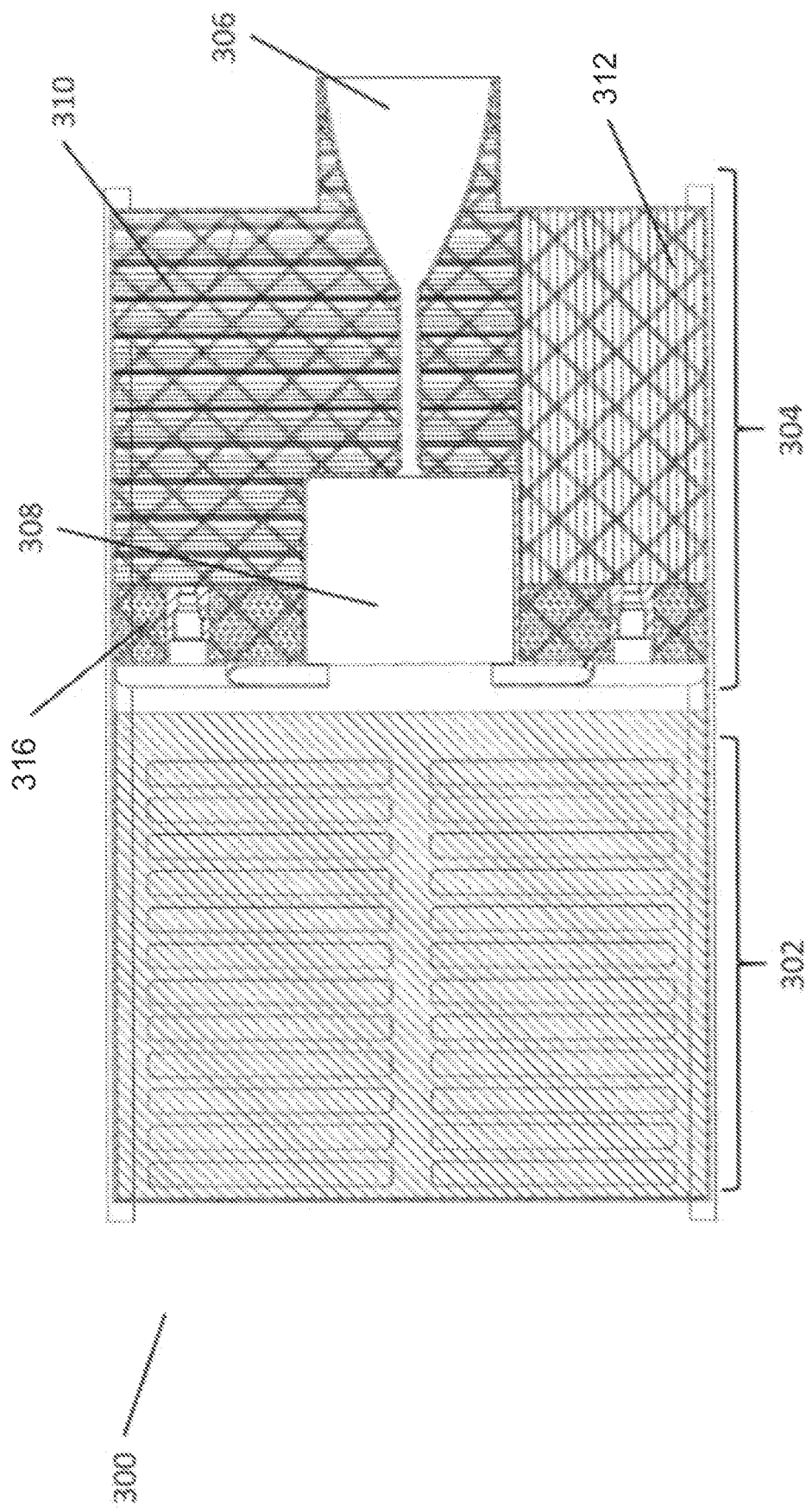
FIG. 3 illustrates another cross sectional view of a satellite structure with an integrated propellant tank structure in accordance with the embodiments of the invention.
Figure 5:
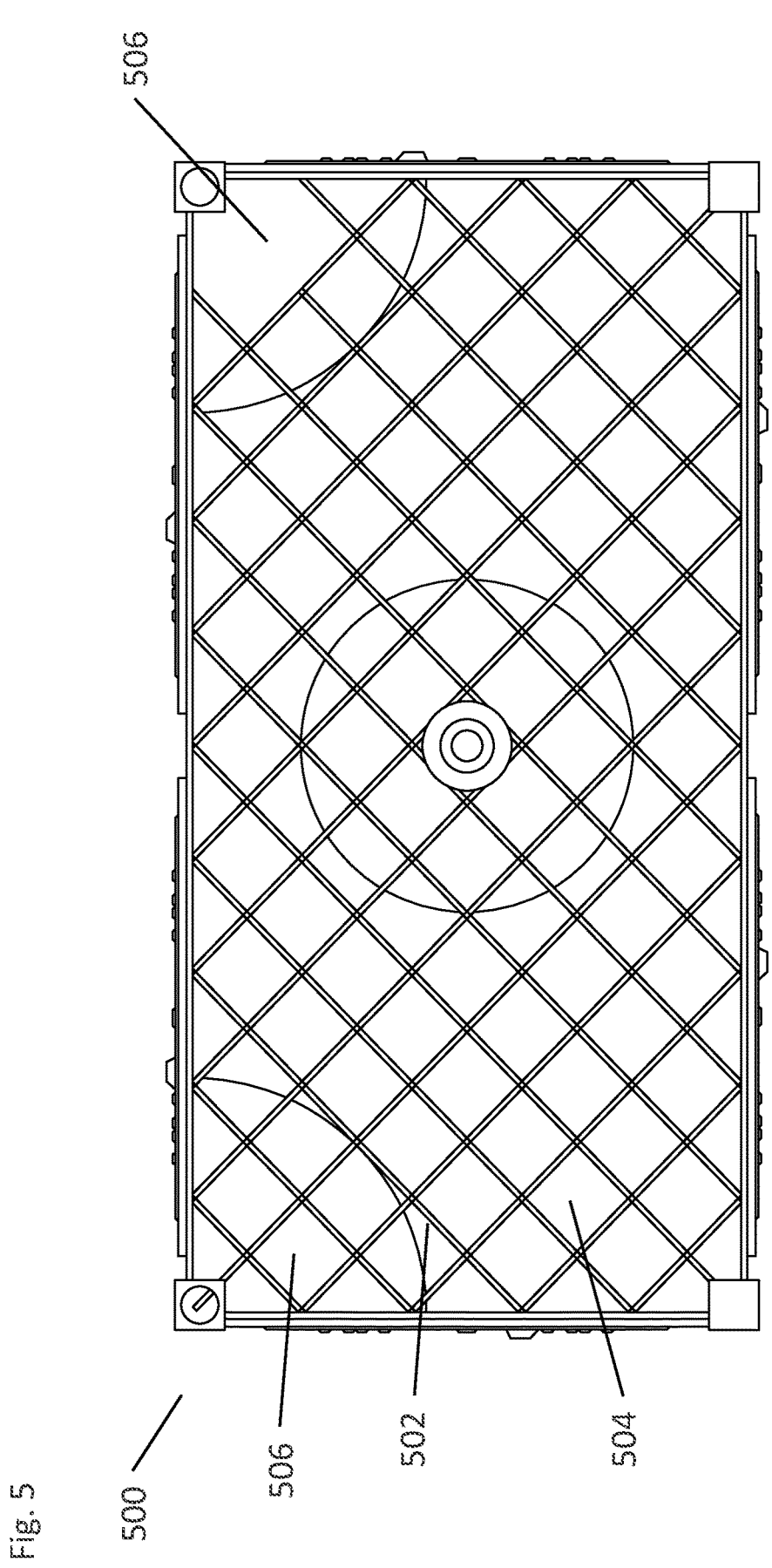
FIG. 5 illustrates a top view of a propellant tank in accordance with embodiments of the invention.

The internal lattice structure shown in FIGS. 2, 3, and 5 can act as an anti-slosh feature by providing additional surface area by which to create additional surface tension within the liquid fuel components. The additional surface tension can help to manage the movement of the fuel within the tanks and thereby reduce the slosh. Moreover, a lattice structure does not take up a large volume within the tank and can thereby reduce the need to other bulky and heavy rings that are often used to control slosh. Therefore, lattice structures, according to many embodiments, can help improve the overall performance of the satellite by reducing the slosh effects and improving the overall weight ratio of the fuel tank system.

FIG. 3 illustrates an additional cross sectional view of a satellite module 300 with a payload portion 302 and a motor portion 304. In accordance with many embodiments, the nozzle 306 and the motor combustion chamber 308 may be integrated within oxidizer fuel tank volume 310. Similar to the cross section of FIG. 2, the motor portion may have a propellant tank volume 312 adjacent to the oxidizer fuel tank volume 310. Additionally, as illustrated in FIGS. 2 and 3, embodiments may incorporate the lattice structure around the motor combustion chamber 308 as well as the nozzle 306. Furthermore, to add strength to the fuel storage volumes (310 and 312) the lattice structure may be integrated around the control valves 316.

Figure 4:
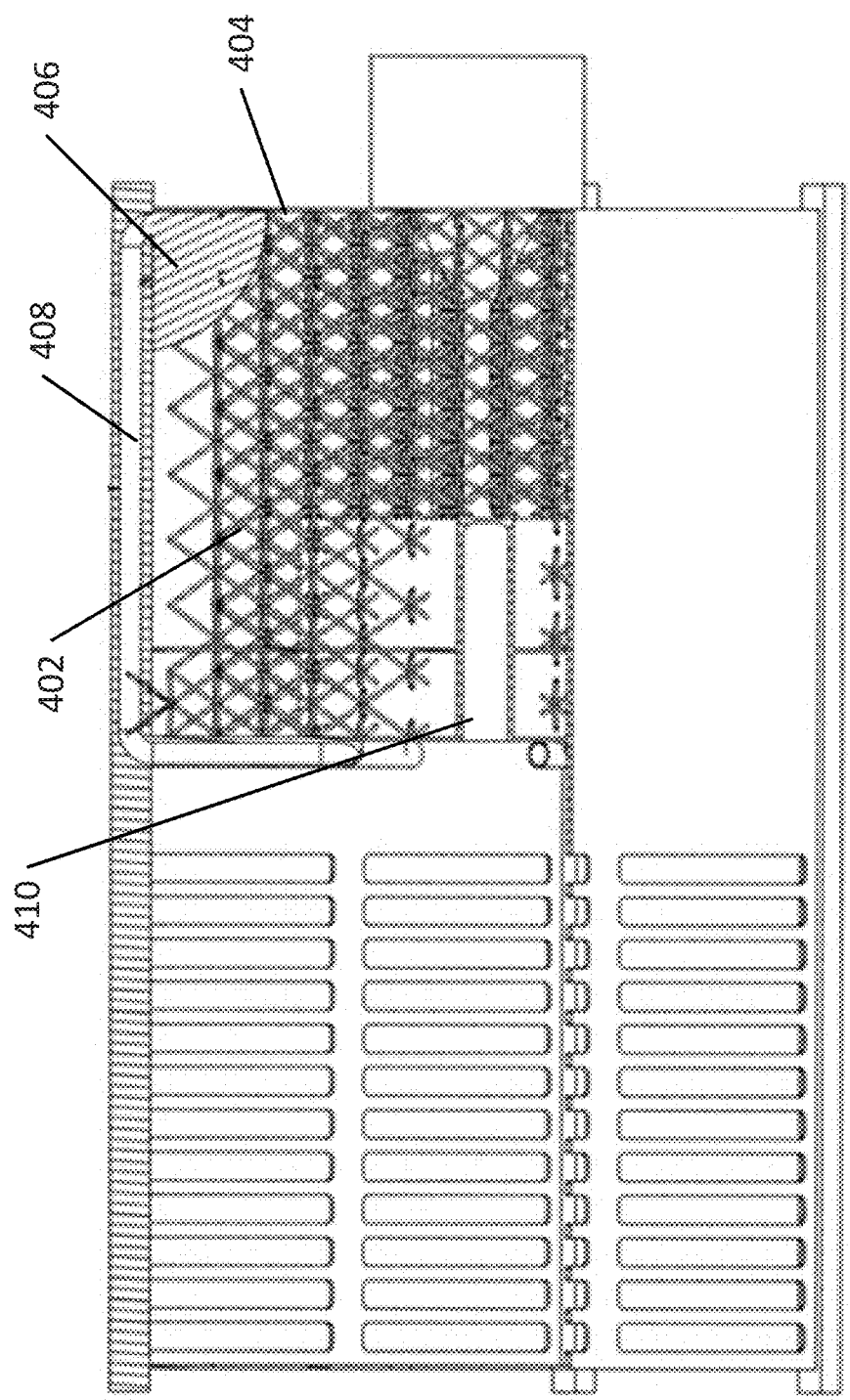
FIG. 4 illustrates a satellite structure with a cut out section illustrating the internal substructures of the propellant tank in accordance with embodiments of the invention.

Turning now to FIG. 4, other embodiments may have additional propellant management devices integrated within the fuel tank system. For example, FIG. 4 illustrates a satellite module 400 with a cut out section of an oxidizer tank illustrating some of the internal components of the system. In accordance with many embodiments, a lattice structure 402 may be integrated within the oxidizer tank 404. As previously discussed with respect to FIGS. 2 and 3, the lattice structure 402 can serve multiple purposes to allow for unconventional tank design as well as provide anti-slosh features within the tank. In many embodiments, another PMD may be integrated within the fuel tank system. As shown in FIG. 4 a PMD 406 may be placed in a corner of the oxidizer tank 404. The PMD, in accordance with some embodiment can be designed to allow for the flow of liquid propellant along a fuel line 408 to the motor combustion unit 410. In accordance with some embodiments the PMD may be made from a metallic foam with a varying gradient density. The metallic foam with varying gradient density can provide a high surface area for which a liquid propellant can coalesce via capillary action. Such dynamics holds true in low gravity settings that satellites are designed to operate in.

FIG. 5 illustrates a top view of a tank 500 with an internal lattice structure 502 located within the internal tank volume 504. Although illustrated in two dimensional format, one can appreciate that the bulk of the internal tank volume 504 is occupied by the lattice structure 502. In some embodiments, the tank 500 may have additional PMD devices 506 positioned within the internal tank volume 504. Similar to embodiments illustrated in FIG. 4, a propellant tank can be configured with one or more additional PMDs to help control the propellant and slosh thereof during the use of the satellite or the tank itself.

Figure 6:
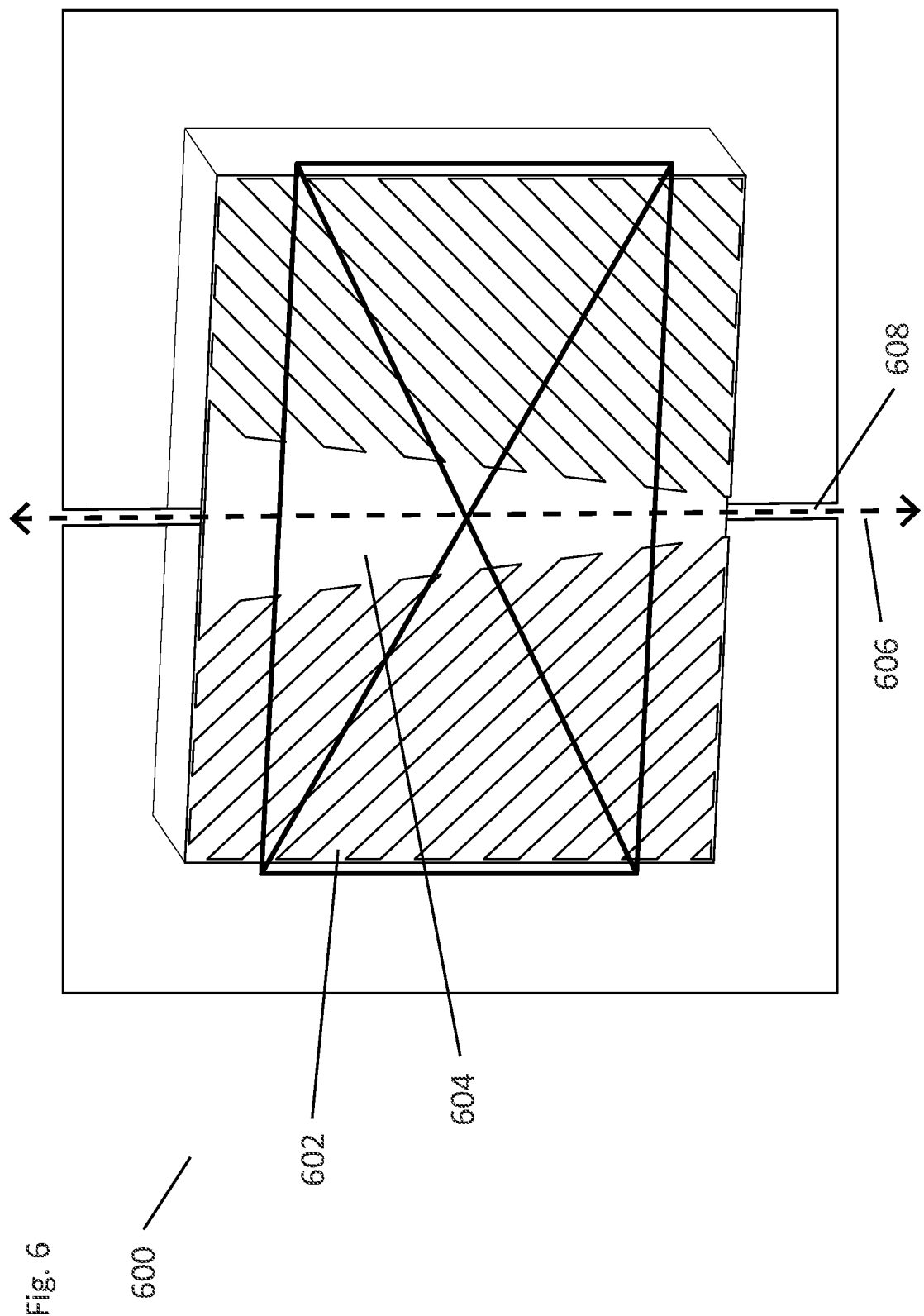
FIG. 6 illustrates a cross sectional view of a propellant tank in accordance with embodiments of the invention.

In various embodiments, the PMD may make up the entirety of the tank itself. For example, FIG. 6 illustrates a cross sectional view of a tank system 600 where the internal portion 602 of the tank is entirely consumed by PMD components 604. In many embodiments, the PMD components 604 are angled towards the centerline 606 of the tank. The internal geometry of the PMD components 604 can be designed such that they act to force the liquid a portion of the tank by becoming a more dense structure or a more tightly packed structure towards the center 606 of the tank. Moreover, some embodiments make the packing denser towards the bottom of the tank as well. This type of configuration can act to force more of the liquid towards a desired portion of the tank such as the bottom or bottom tubing 608.

Variations in the PMD

Figure 7:
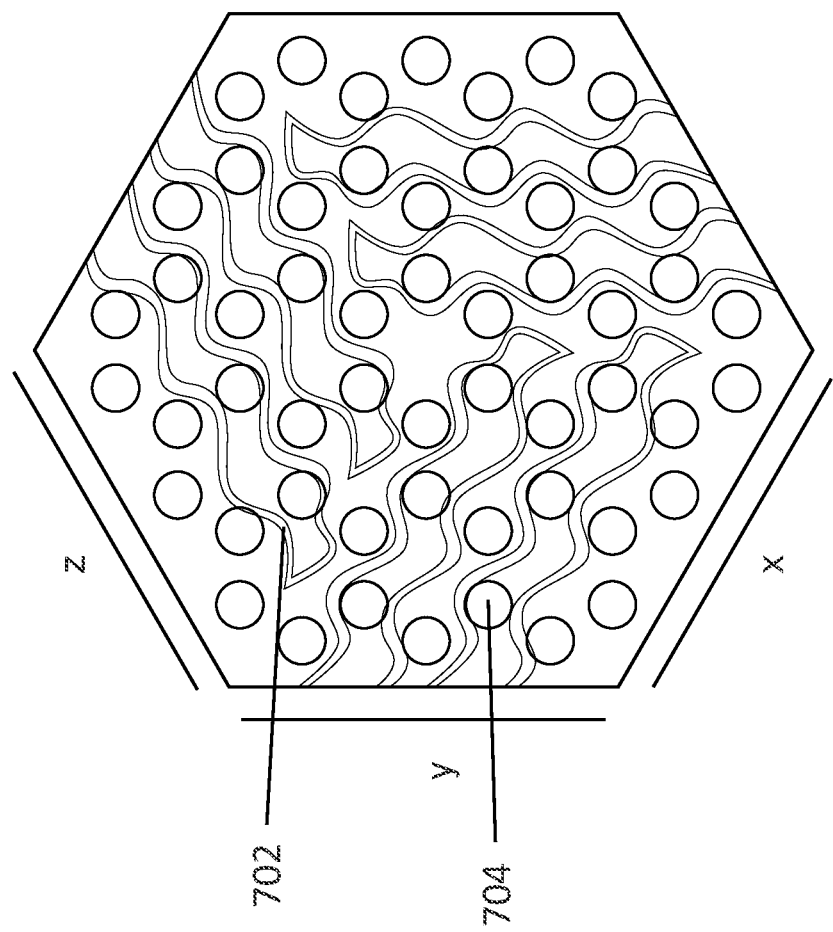
FIGS. 7 through 9 illustrated propellant management device geometries in accordance with embodiments of the invention.
Figure 8:
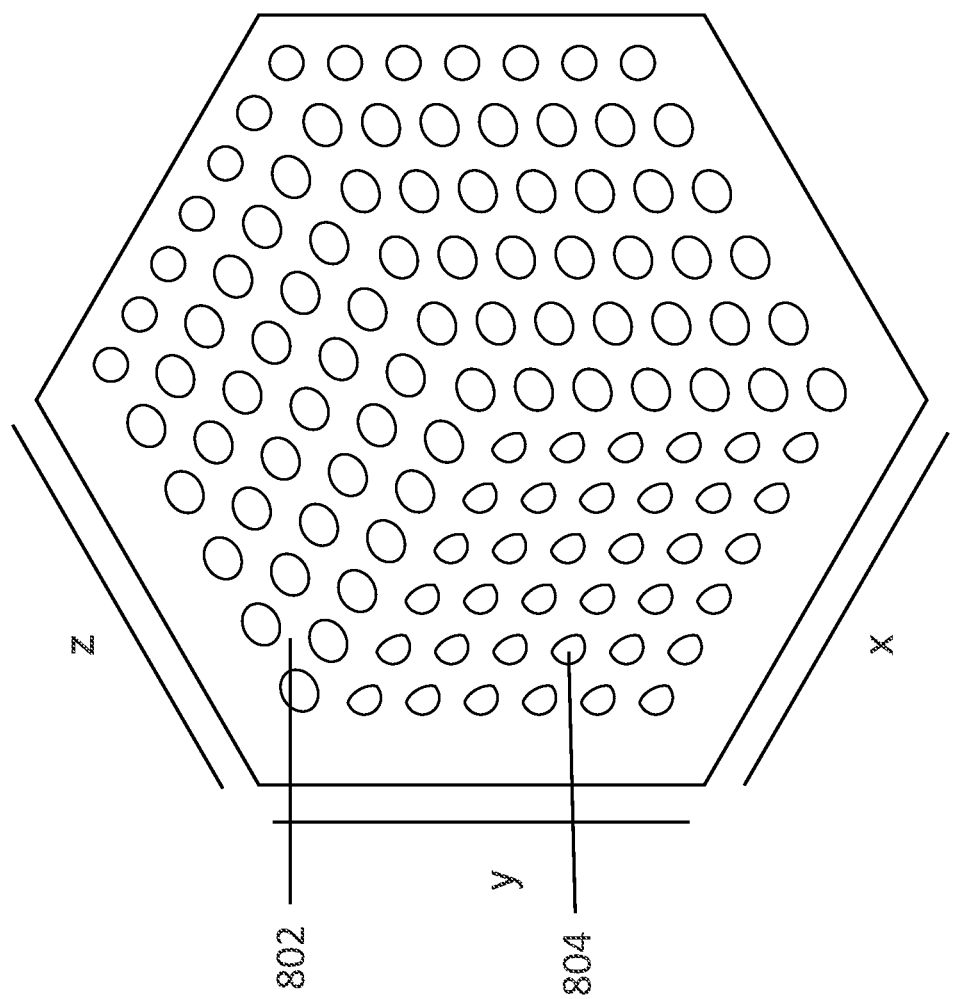
Figure 9:
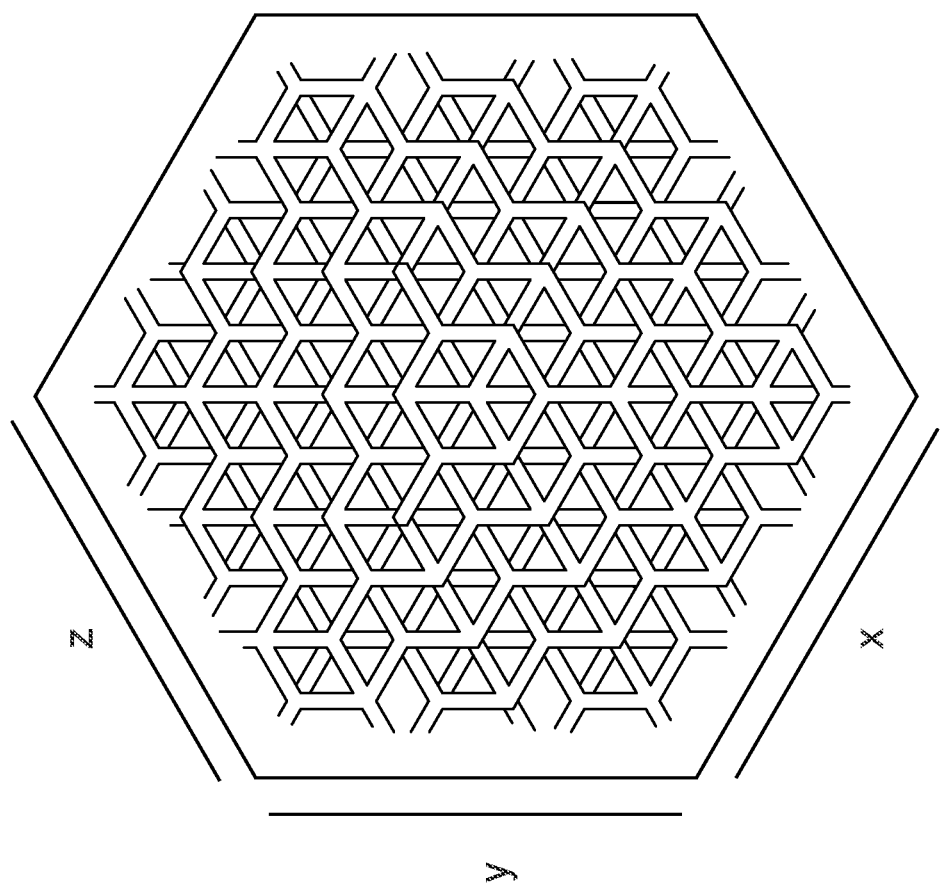

In accordance with many embodiments the PMD components that make up the entirety of the tank can take on any number of geometric shapes and or configurations. For example, FIGS. 7 through 9 illustrate embodiments of a PMD structure that may be implemented within the internal cavity of the tank. In some embodiments, the PMD may belong to a group of geometry called Triply Periodic Minimal Surface (TPMS). A TPMS structure or geometry is a surface of minimal area between given boundaries that repeats its structure in three dimensions. Such shapes can prove to be effective in managing the propellant within a tank system. Hence their practical use in many embodiments.

FIG. 7 for example, illustrates a PMD structure in the form of a TPMS that has a gyroid geometry. As can be seen in FIG. 7, the PMD geometry sample 700 rests in a traditional Cartesian coordinate system with an X, Y, and Z axis. It can be appreciated, with an understanding of TPMS geometries that the gyroid geometry 700 may have a variety of solid structures 702 with intermittent spaces 704 dispersed throughout the geometry. Further, it can be appreciated that some embodiments can take the basic gyroid geometry 700 and reproduce it throughout the tank. Thus, making a solid tank with an internal geometry that resembles the basic gyroid structure 700. Likewise, many embodiments may incorporate one or more additional geometries to form the tank.

For example, FIG. 8 illustrates a basic Schwarz geometry 800. Similar to the gyroid geometry in FIG. 7, the Schwarz geometry may have a patterned structure of solid components 802 with a corresponding pattern of spaces 804. Various embodiments, may implement a duplicated pattern of the basic Schwarz geometry 800 to form the tank structure, thus producing a tank with the PMD and anti-slosh features built into the tank during fabrication. Similar to embodiments described above regarding a lattice, the PMD tank can perform similarly and help to reduce cost and production time of the tank and adjoining structures. Similar to embodiments portrayed in FIGS. 7 and 8, FIG. 9 illustrates a diamond type geometry 900. In accordance with some embodiments, the geometries of the internal PMD and/or lattice structure may also take on the shape of a Fluorite or an Octet structure. Although certain geometries are illustrated, it can be appreciated that any number of geometries can be used to fill the internal cavities of a tank to produce the anti-slosh features as well as function as PMD elements within the tank.

Moreover, it can be appreciated that any number of materials can be used to manufacture the tank and/or any internal and adjoining components. For example, different embodiments may use a titanium alloy such as TI-6Al-4V. Titanium alloys can be very useful in terms of space craft design and use. They tend to be very strong and relatively light weight when compared to steel. Additionally, titanium alloys are often very compatible with a large variety of propellants, making them ideal candidates for production. Additionally, as will be described with respect to manufacturing, titanium alloys tend to be well understood in the realm of additive manufacturing making them easy to use for the production of complex components. In other embodiments, the tank may utilize aluminum alloys such as Al7075 or Al6061. It can be appreciated that any number of materials can be used such that the strength/weight ratios are desirable for use and such that the material is compatible with a range of propellants.

As can be appreciated, many embodiments involve complex structures which can prove difficult to produce with traditional manufacturing methods. Accordingly, some embodiments may utilize additive manufacturing in conjunction with traditional methods to produce the tank, internal structures as well as some adjoining structures. As can be appreciated, additive manufacturing can allow for simultaneous builds of the tank and/or PMD elements which can result in large cost and time savings.

Improvements in additive manufacturing or 3D printing, has provided solutions to many of the problems that plague traditional manufacturing methodologies. As mentioned, additive manufacturing can allow for the production of complex structures and geometries that traditional methods struggle to produce. For example, some embodiments may utilize powder bed E-beam additive manufacturing technology to produce an integrated propellant tank with internal PMD and anti-sloshing features. In some embodiments the entire tank and integrated motor components can be produced using a single step production. This can help to reduce the cost and time typically involved in tank manufacturing Not only can additive manufacturing be used to produce complex integrated structures of the various embodiments, many embodiment may incorporate traditional manufacturing methods with additive manufacturing. For example, in some embodiments, the satellite structure, to include the integrated motor portion, may be produced using additive manufacturing while other portions are adaptable to more traditional methods for attaching or incorporating other components. Some embodiments similar to those illustrated in FIGS. 2 through 4 may use more traditional methods to affix control components, electronic components, or scientific test equipment to the payload section of the satellite. Additionally, similar traditional methods may be used to install valve assemblies or other components of the combustion module. One example can be illustrated in FIGS. 10A and 10B.

Figure 10B:
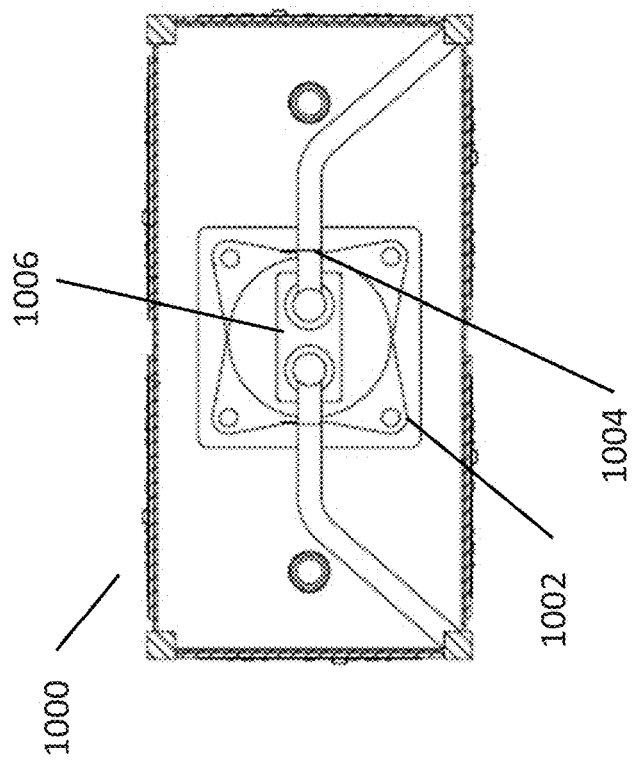
FIGS. 10a and 10b illustrate a cross sectional top view of a satellite motor mounting structure in accordance with embodiments of the invention.
Figure 10A:
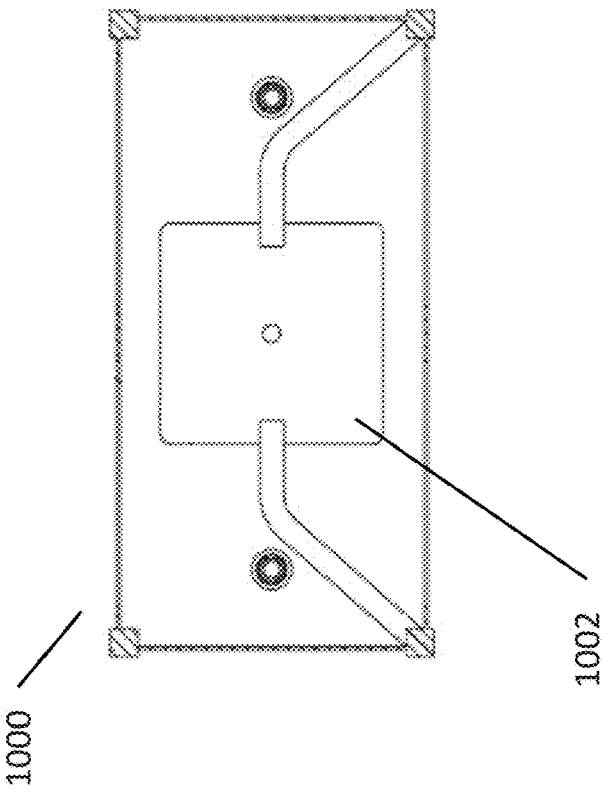

FIGS. 10A and 10B illustrate a top view of a cross section of an embodiment of a satellite module 1000 looking at portions of the motor combustion chamber 1002. Many embodiments may incorporate the use of a liquid propellant, as describe earlier, and as such may have a fuel line 1004 that runs into the motor combustion chamber 1002. Traditional methods of manufacture such as welding may be used to connect the fuel lines 1004 to one or more valve assemblies 1006 and or the motor combustion chamber housing. Therefore, many embodiments may incorporate both additive manufacturing techniques as well as traditional manufacturing methodologies.

DOCTRINE OF EQUIVALENTS

As can be inferred from the above discussion, the above-mentioned concepts can be implemented in a variety of arrangements in accordance with embodiments of the invention. Specifically, many embodiments capitalize on the improvements with additive manufacturing and the ability to produce complex structures. Moreover, many embodiments capitalize on the unique properties and design of a lattice structure to allow for more unconventional yet packaging efficient fuel storage systems. Achieving such functionality, according to embodiments, involves the implementation of special arrangements/designs between subsystems described above, and their equivalents.

Accordingly, although the present invention has been described in certain specific aspects, many additional modifications and variations would be apparent to those skilled in the art. It is therefore to be understood that the present invention may be practiced otherwise than specifically described. Thus, embodiments of the present invention should be considered in all respects as illustrative and not restrictive.

What is claimed is:

1. A liquid propellant storage system comprising:
a fuel tank with an inner wall surface forming an internal cavity of the fuel tank wherein the internal cavity is configured to contain a liquid fuel;
a lattice structure disposed within the internal cavity, and the lattice structure thereby occupying a volume within the internal cavity, wherein the lattice structure comprises multiple interlinking members that extend across the internal cavity from one edge of the inner tank wall to another edge and the lattice structure is connected to a plurality of points on the inner wall surface of the fuel tank such that the lattice structure provides additional strength to the fuel tank and wherein the lattice structure provides additional surface area by which a slosh of the liquid fuel within the fuel tank may be reduced; and
wherein the fuel tank further comprises a propellant management device disposed in a corner of the fuel tank wherein the propellant management device allows the liquid fuel to coalesce via capillary action and allows the flow of fuel from the internal cavity of the fuel tank to a fuel line.

2. The liquid propellant storage system of claim 1, wherein the propellant management device has a variable gradient density.

3. The liquid propellant storage system of claim 1, wherein the shape of the fuel tank is selected from a group consisting of, cuboidal, spherical, prismatic, and conical.

4. The liquid propellant storage system of claim 1, further comprising a motor system, the motor system comprising:
an exhaust nozzle, the exhaust nozzle integrated within the volume of the fuel tank; and
a motor combustion chamber, the motor combustion chamber connected to the exhaust nozzle, and the motor combustion chamber integrated within the volume of the fuel tank, and
wherein the motor system receives fuel from the fuel tank into the motor combustion chamber through a fuel line.

5. The liquid propellant storage system of claim 4, further comprising at least one fuel control valve integrated within the volume of the internal cavity of the fuel tank and wherein the at least one fuel control valve controls the flow of fuel from the internal cavity to the motor system.

6. The liquid propellant storage system of claim 4, further comprising a motor combustion control disposed within the volume of the fuel tank.

7. A satellite structure comprising
a liquid propellant storage system comprising:
a fuel tank with an inner wall surface forming an internal cavity of the fuel tank wherein the internal cavity is configured to contain a liquid fuel;
a lattice structure disposed within the internal cavity thereby occupying a volume within the cavity, wherein the lattice structure comprises multiple interlinking members that extend across the internal cavity from one edge of the inner wall surface to another edge and the lattice structure is connected to a plurality of points on the inner wall surface of the fuel tank such that the lattice structure provides additional strength to the fuel tank and wherein the lattice structure provides additional surface area by which a slosh of the liquid fuel within the fuel tank may be reduced during movement; and
wherein the multiple interlinking members extend across a diameter of the internal cavity.

8. The satellite structure of claim 7 wherein the fuel tank further comprises a propellant management device disposed in a corner of the fuel tank wherein the propellant management device allows the liquid fuel to coalesce via capillary action and allows the flow of fuel from the internal cavity of the fuel tank to a fuel line.

9. The satellite structure of claim 8, where in the propellant management device and the lattice structure are made from a metallic foam.

10. The satellite structure of claim 8, wherein the propellant management device has a variable gradient density.

11. The satellite structure of claim 7, wherein the shape of the fuel tank is selected from a group consisting of, cuboidal, spherical, prismatic, and conical.

12. The satellite structure of claim 10, further comprising a motor system, the motor system comprising:
an exhaust nozzle, the exhaust nozzle integrated within the volume of the fuel tank; and
a motor combustion chamber, the motor combustion chamber connected to the exhaust nozzle, and the motor combustion chamber integrated within the volume of the fuel tank, and
wherein the motor system receives fuel from the fuel tank into the motor combustion chamber through a fuel line.

13. The satellite structure of claim 12, further comprising at least one fuel control valve integrated within the volume of the internal cavity of the fuel tank and wherein the at least one fuel control valve controls a flow of propellant from the internal cavity to the motor system.

14. The satellite structure of claim 13, further comprising a motor combustion control disposed within the volume of the fuel tank.

15. A liquid propellant storage system comprising:
a fuel tank with an inner wall surface forming an internal cavity of the fuel tank wherein the internal cavity is configured to contain a liquid fuel,
a propellant management device disposed within the internal cavity wherein the propellant management device occupies the entire internal cavity and wherein the propellant management device has a plurality of geometric shapes defining a geometry wherein the defined geometry comprises multiple interlinking members that extend across the internal cavity from one edge of the inner wall surface to another edge such that the liquid fuel can flow within the plurality of geometric shapes.

16. The liquid propellant storage system of claim 15, wherein the geometry is selected from a group consisting of gyroid, and Schwarz.

17. The liquid propellant storage system of claim 1, wherein the multiple interlinking members extend across a diameter of the internal cavity.

18. The liquid propellant storage system of claim 15, wherein the multiple interlinking members extend across a diameter of the internal cavity.

* * * * *